Nov. 16, 1948.  B. B. MANASTER  2,453,922
CHILD'S COMBINATION APPETITE-STIMULATING
AND AMUSEMENT DEVICES
Filed July 2, 1948

INVENTOR.
Ben B. Manaster
BY Clarence E. Threedy
His Attorney.

Patented Nov. 16, 1948

2,453,922

UNITED STATES PATENT OFFICE 2,453,922

CHILD'S COMBINATION APPETITE-STIMULATING AND AMUSEMENT DEVICE

Ben B. Manaster, Chicago, Ill.

Application July 2, 1948, Serial No. 36,773

4 Claims. (Cl. 46—141)

This invention relates to child's combination appetite-stimulating and amusement devices.

An object of the invention is to provide a character simulating an animal such, for example, as a dog in a sitting position, adjacent a dish or bowl to stimulate a child's interest in eating by arranging the head of the character in a posture which presents an appeal for something to eat, and which head is capable of vibratory or oscillating action by virtue of contact with a feeding spoon, whereby to simulate feeding action. It is the intent that this character thus arranged adjacent the dish or bowl will have the effect of inducing the child to alternately feed itself and the character, thus stimulating the child to consume its food.

Other objects will appear hereinafter.

The invention consists in the novel combination and arrangement of parts to be hereinafter described and claimed.

The invention will be best understood by reference to the accompanying drawings showing the preferred form of construction, and in which.

Figures 1, 2, 3:
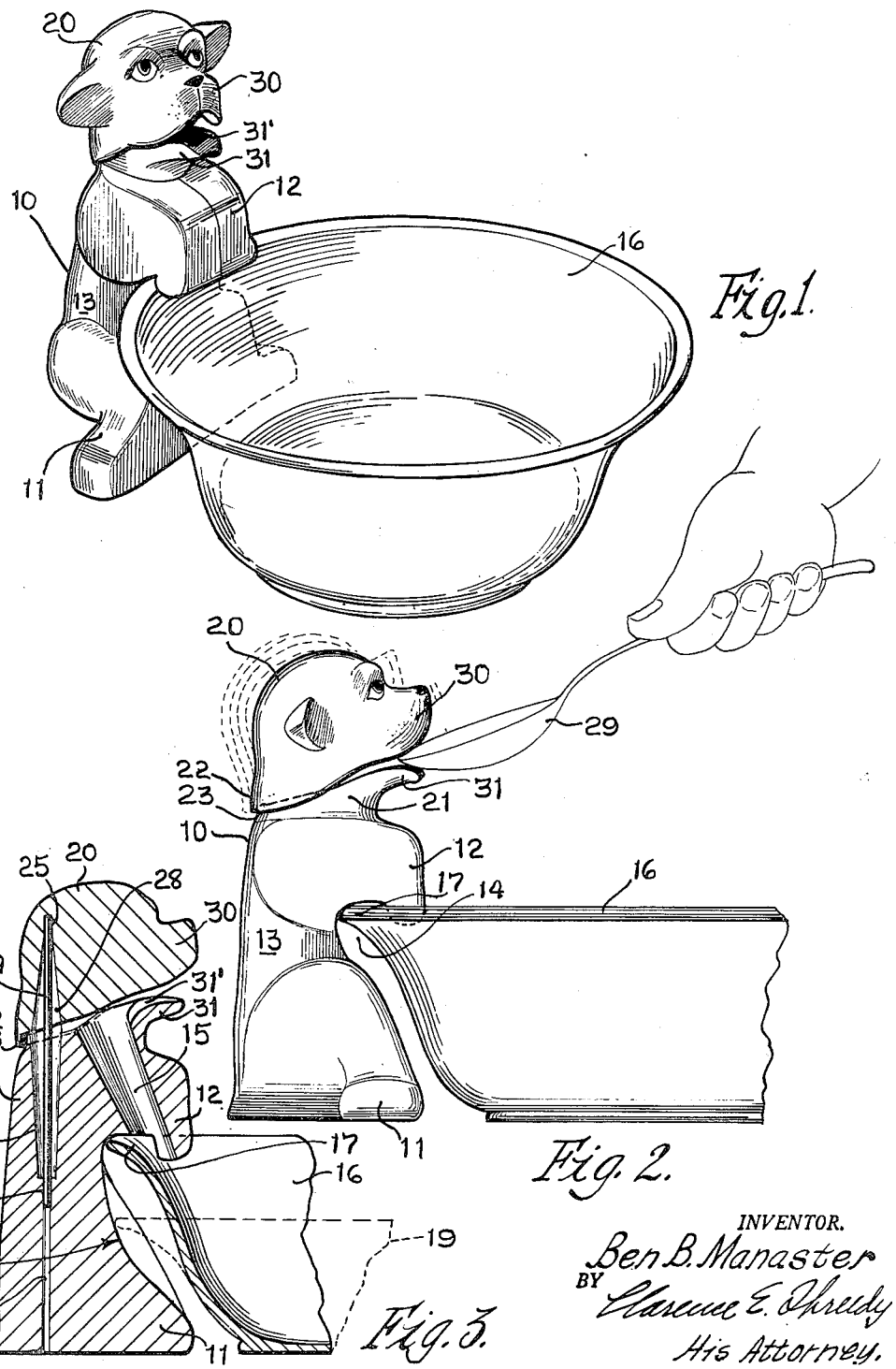
Fig. 1 is a perspective view of the invention showing the same in sitting position with respect to a bowl or dish.
Fig. 2 is a side elevational view of the same.
Fig. 3 is a vertical sectional detail view of the same.

To accomplish the several objects of my invention, I provide a character 10 which, in the present instance, is formed in the shape of a dog in sitting position upon its hind legs 11. The front legs or paws 12 of the dog are arranged with respect to the body 13 thereof so as to provide an undercut 14. The paws 12 slightly depend into the dish 16 so that the dish and the body 13 cannot be easily moved apart.

Formed through the body 13 is a channel or passage 15. The undercut 14 is of such depth as permits the bowl or dish 16 to be positioned with respect to the body 13 with the edge portion 17 disposed within the undercut 14 beneath the paws 12, with the channel 15 communicating with the interior of the bowl 16. By reason of the character of the wall 18 of the cut-out portion, bowls of various heights may be used, such as indicated at 19. This follows from the fact that the curved wall 18 permits the positioning of bowls of various heights within the undercut, with the interior of the bowl communicating with the channel 15 so that food or liquid passing through the channel 15 will move or flow into the bowl without spilling therefrom.

The head 20 of the dog is normally supported in spaced relation with respect to the neck portion 21 thereof with the portion 22 of the head slightly overlapping the nape 23 of the neck, whereby the overlapping portion 22 of the head 20 will contact the nape of the neck to limit the movement of the head 20 upwardly.

The head 20 is supported for vibratory or oscillatory movement upon the body 10 by means of a shaft 24, one end of which is fixedly embedded in the head 20 as at 25 and the opposite end 26 of which is removably projected in an opening 27 formed in the body 13.

Portions of the head and body are removed to provide clearance between the head and body and the shaft 24 as at 28. This clearance permits the head to vibrate or oscillate vigorously when contacted by the end of a spoon 29.

As before stated, the object of this invention is two-fold: First, to provide amusement for a child during eating, and, second, to stimulate eating of the food by the child. This may result from the fact that the child is instructed or suggested to give spoonfuls of food alternately to itself and the dog or other character.

The head of the dog normally is positioned with respect to the body so that the jaws 30 and 31 of the dog are in partially open, or "begging," position, being spaced apart a sufficient distance to permit initial insertion of the end of the spoon between the jaws 30 and 31. As the child attempts to discharge the food from the spoon into the mouth of the dog, the head 20 by pressure of the spoon 29 against the jaw 30 will be tilted rearwardly against the action of the shaft 24. When this pressure of the spoon is removed from jaw 30, the shaft 24, being of resilient material, will cause the head to vigorously vibrate or oscillate to simulate eating action by the dog. Food deposited in the mouth of the dog between the jaws 30 and 31 will be guided to the channel 15 by the jaw 30, which is concave transversely to provide a groove 31' leading to the channel 15, and such food will pass through the channel 15 back into the bowl 16. To a great extent, the overlapping portion 22 of the head will serve to prevent food from passing rearwardly out between the head of the dog and the body thereof.

While I have illustrated the character in the form of a dog, it is manifest that the character may take other forms of animals.

Inasmuch as the shaft 24 is fixedly secured to the head 20, the head may be removed by withdrawing the end 26 of the shaft from the opening 27 for cleansing purposes.

It will be noted that the relative position between the jaws of the head 20 and the dish 16 is such that the jaws project over the rim of the bowl or dish so that any food spilled during the feeding of the dog or other character, will fall back into the bowl 16.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A child's combination appetite-stimulating and amusement device comprising a body having an undercut portion formed therein for the reception of the edge portion of a dish and having a channel therein inclined downwardly and forwardly toward the dish for communication with said dish, said body having a protruding jaw portion providing a rest for the end of a spoon delivering material to said channel, a head for said body and arranged over said channel and having a jaw portion in spaced confronting relation with respect to the jaw portion of said body and adapted to be engaged by the end of said spoon and tilted relative to said body by said spoon, and means connecting the head to the body for oscillatory movement with respect to the body when said spoon is moved from engagement with respect to said head.

2. A child's combination appetite-stimulating and amusement device comprising a body having an undercut portion formed therein for the reception of the edge portion of a dish and having a channel therein inclined downwardly and forwardly toward the dish for communication with said dish, said body having a protruding jaw portion providing a rest for the end of a spoon delivering material to said channel, a head for said body and arranged over said channel and having a jaw portion in spaced confronting relation with respect to the jaw portion of said body and adapted to be engaged by the end of said spoon and tilted relative to said body by said spoon, and means connecting the head to the body for oscillatory movement with respect to the body when said spoon is moved from engagement with respect to said head, said means including a flexible shaft fixedly secured to the head and removably inserted in an opening formed in the body.

3. A child's combination appetite-stimulating and amusement device comprising a body having an undercut portion formed therein for the reception of the edge portion of a dish and having a channel therein inclined downwardly and forwardly toward the dish for communication with said dish, said body having a protruding jaw portion providing a rest for the end of a spoon delivering material to said channel, a head for said body and arranged over said channel and having a jaw portion in spaced confronting relation with respect to the jaw portion of said body and adapted to be engaged by the end of said spoon and tilted relative to said body by said spoon, and means connecting the head to the body for oscillatory movement with respect to the body when said spoon is moved from engagement with respect to said head, said head having a portion opposite the jaw portion thereof disposed in overlapping relation with respect to an adjacent portion of said body.

4. A child's combination appetite-stimulating and amusement device comprising a character simulating a dog in sitting position upon its hind legs with its front legs projecting forwardly over a cut-out portion provided in the body for the reception of the edge portion of a dish, with the ends of the front legs projecting over the rim of the dish, said body having an inclined downwardly extending channel formed therein for communication with said dish and said body being provided with a jaw portion providing a rest for the end of a spoon, a head for said body providing a jaw portion in confronting relation with respect to the jaw of said body and adapted for engagement with said spoon, a flexible shaft connecting the head to the body, said head being adapted to be tilted upwardly and away from said body by said spoon and when said spoon is disengaged from said head, said flexible shaft serving to oscillate said head to simulate eating action.

BEN B. MANASTER.

No references cited.